US009814217B2

(12) United States Patent
Zhu et al.

(10) Patent No.: US 9,814,217 B2
(45) Date of Patent: Nov. 14, 2017

(54) PET LEASH

(71) Applicant: Suzhou Petmate Industry & Trade Co., Ltd., Suzhou, Jiangsu Province (CN)

(72) Inventors: Haiyuan Zhu, Suzhou (CN); Xinggen Huang, Suzhou (CN)

(73) Assignee: SUZHOU PETMATE INDUSTRY & TRADE CO., LTD., Suzhou, Jiangsu (CN)

(*) Notice: Subject to any disclaimer, the term of this patent is extended or adjusted under 35 U.S.C. 154(b) by 126 days.

(21) Appl. No.: 14/845,260

(22) Filed: Sep. 3, 2015

(65) Prior Publication Data

US 2016/0120152 A1 May 5, 2016

(30) Foreign Application Priority Data

Oct. 29, 2014 (CN) .......................... 2014 1 0593295

(51) Int. Cl.
*A01K 27/00* (2006.01)
(52) U.S. Cl.
CPC .................................. *A01K 27/004* (2013.01)
(58) Field of Classification Search
CPC .. A01K 27/001; A01K 27/002; A01K 27/003; A01K 27/004; A01K 27/005; A01K 27/006; A01K 27/007; A01K 27/008; A01K 27/009; B65H 75/34; B65H 75/36; B65H 75/362; B65H 75/364; B65H 75/38; B65H 75/40; B65H 75/406; B65H 75/48; B65H 75/4473; B65H 75/4402; B65H 75/441; B65H 75/4413; B65H 75/4415; B65H 75/4418; B65H 75/4421; B65H 75/4423; B65H 75/4426; B65H 75/442

USPC ....... 119/796, 797, 798, 799, 801, 802, 803, 119/804, 807
See application file for complete search history.

(56) References Cited

U.S. PATENT DOCUMENTS

| | | | | |
|---|---|---|---|---|
| 6,405,683 | B1 * | 6/2002 | Walter ................. | A01K 27/004 119/772 |
| 6,526,918 | B1 * | 3/2003 | Arnold ............... | B65H 75/4431 119/796 |
| 2006/0207522 | A1 * | 9/2006 | Perkitny .............. | A01K 27/004 119/796 |
| 2010/0107992 | A1 * | 5/2010 | Chefetz ................ | A01K 27/004 119/796 |

(Continued)

FOREIGN PATENT DOCUMENTS

DE         19930092 A1 *  1/2001   ........... A01K 27/004

*Primary Examiner* — Tien Dinh
*Assistant Examiner* — Ebony Evans
(74) *Attorney, Agent, or Firm* — Han IP Corporation; Andy M. Han

(57) ABSTRACT

A pet leash is provided. The pet leash includes a housing with a handle formed thereon, a turntable rotationally disposed in the housing, and a hauling rope coiled on the turntable. The housing is provided with a rope hole for leading out the hauling rope, and the handle is provided with a button exposed out of the housing. A user can quickly restrain a pet from running away simply by pressing the button on the leash. The pet would therefore be kept within a controllable range from the user to avoid an accident. Moreover, the user can lock the leash in that state by moving a push button disposed inside the button, and then release the leash from the locked state by moving the push button in the opposite direction.

8 Claims, 5 Drawing Sheets

(56) References Cited

U.S. PATENT DOCUMENTS

| | | | | |
|---|---|---|---|---|
| 2011/0168829 A1* | 7/2011 | Okumura | ............ | A01K 27/004 242/384.7 |
| 2011/0180017 A1* | 7/2011 | Goldenberg | ....... | B65H 75/4431 119/796 |
| 2012/0079994 A1* | 4/2012 | Chefetz | ................ | A01K 27/004 119/796 |

* cited by examiner

PET LEASH

CROSS-REFERENCE TO RELATED PATENT APPLICATIONS

This application claims the priority benefit of China Patent Application No. 2014105932958, filed on Oct. 29, 2014, which is incorporated by reference in its entirety.

TECHNICAL FIELD

The present disclosure relates to the field of pet care products, specifically to a pet leash.

BACKGROUND

In order to prevent pets from straying, pet owners often employ pet leashes. Pet leashes currently available on the market come in various kinds and styles. In general, a pet leash may include a housing, a turntable disposed in the housing, and a hauling rope coiled on the turntable. In addition, a revolving body may be disposed between the housing and the turntable for retracting the hauling rope automatically.

A traditional pet leash as such has the following disadvantages:

(1) When the pet suddenly runs away as it is frightened or intending to attack, it can pull out the hauling rope coiled on the reel very quickly, and the pet owner would not be able to react in time and brake the turntable in the leash to stop the pet. An accident may be resulted.

(2) Even if a button is provided on the pet leash to brake the turntable, as the pet pulls the hauling rope in the braking mode, an impact would be imposed on the turntable and the button. The impact could damage the button and cause the braking to fail.

(3) The button on the pet leash normally has only two modes of operation, namely, locking and unlocking. It does not provide a "stutter braking" mode, which is needed to effectively control the pet.

(4) The turntable cannot be conveniently braked or locked in the braking mode.

SUMMARY

A purpose of the present disclosure is as follows: In order to solve the aforementioned problems, a pet leash is provided, wherein a user is able to quickly brake the turntable in the leash by lightly pressing a button on the leash.

A technical solution of the present disclosure is as follows: A pet leash is provided that may include a housing with a handle formed thereon, a turntable rotationally disposed in the housing, and a hauling rope coiled on the turntable. The housing may be provided with a rope hole for leading out the hauling rope, and the handle may be provided with a button exposed out of the housing. A clamping block may be provided inside the housing and mechanically coupled with the button for linkage operations. Furthermore, a return spring may be disposed between the clamping block and the housing, and the turntable may be provided with a plurality of clamping teeth formed thereon that are configured to engage with the clamping block. In a natural state, due to an elastic force of the return spring, the clamping block is separated from the clamping teeth, and the turntable is allowed to rotate freely. When the button is pressed, through the mechanical coupling, the clamping block is engaged with the clamping teeth, and the turntable is circumferentially locked.

Based on the above technical solution, the present disclosure further includes the following preferred solutions:

The clamping block may include a turning sleeve that is rotationally mounted in the housing. The turning sleeve may be provided on its outer wall with a button fitting portion, a spring fitting portion and a clamping-tooth fitting portion. Each of the three fitting portions may extend radially outward from a center of the turning sleeve. In addition, the return spring may be clamped between the spring fitting portion and the housing.

The button may include a button body that is exposed out of the housing. The button may also include a hinged end that is disposed on a rear end of the button body, hinged with an inner side of the housing. The button may further include a drive end that is disposed on a front end of the button body, abutting against the button fitting portion.

In the natural state, under the action of the elastic force of the return spring, the turning sleeve is in a first angular position, such that the clamping-tooth fitting portion is separated from the clamping teeth and the turntable is allowed to rotate freely. When the button is pressed, the drive end on the front end of the button body abuts and moves the button fitting portion, thereby driving the turning sleeve to rotate to a second angular position. The clamping-tooth fitting portion is thus engaged with the clamping teeth, and the turntable is circumferentially locked.

The button fitting portion may be connected to the clamping-tooth fitting portion through a reinforcement plate disposed between them.

A spring-positioning boss may be provided at an end of the spring fitting portion. A spring-positioning groove may be provided on the inner side of the housing. A first end of the return spring may be sleeved onto the spring-positioning boss and a second end of the return spring may abut an inner side of the spring-positioning groove.

The rope hole may be provided with a rubber collar.

The inner side of the housing may be provided with a limiting stop pin that is configured to engage with the spring fitting portion.

The clamping-tooth fitting portion may be provided at its end with a guiding groove that is configured to engage with the turntable.

The button body may be provided with a limiting push plate that is configured to move back and forth. The button body may also be provided with a push button that is fixed on the limiting push plate. The limiting push plate may be located inside the housing, and the push button may be located outside the housing. Also, there may be a clamping groove formed inside the housing that is configured to engage with the limiting push plate.

The limiting push plate may be connected with an elastic clamping strip, and the elastic clamping strip may have at its end a limiting boss that is configured to engage with the button body.

Each of the clamping teeth may have a tooth tip portion and an arcuate guide slant extending from the tooth tip portion downward toward a center of the turntable.

The present disclosure has the following advantages:

1. When the button of the pet leash is pressed, the turntable in the leash is locked circumferentially and the hauling rope is refrained from being pulled out, effectively limiting the pet's running range.

2. The design of the arcuate guide slants on the clamping teeth not only increases the structural strength of the clamping teeth, but also reduces the contact area of the clamping teeth with the clamping block. This is advantageous to the engagement of the clamping block with the clamping teeth, as it maximally prevents the clamping block from going "tip-against-tip" with the clamping teeth, a situation that would have prevented the button from being pressed down and thus failed the locking. The design would also prevent the button from being damaged by the impact introduced by the locking action. The engaging of the clamping block with a rotational movement, combined with the guiding provided by the arcuate guide slants of the clamping teeth, guarantees the timely engagement of the clamping block for braking. This mechanism maximally prevents the clamping block from going tip-against-tip with the clamping teeth, a situation that would have prevented the two parts from engaging with and locking each other.

3. Upon the button being press by the user, the turntable is locked and the hauling rope is thus prevented from being pulled out. In the case where the push button is not locked, as soon as the button is released, the clamping block and the button are immediately restored to their respective previous positions by the return spring, unlocking the turntable. This mechanism allows the realization of "stutter braking" the turntable. In the case where the button is locked by first pressing the button and then pushing the push button to lock the button in the "pressed" position, the turntable remains braked even if the button is released. That is, the user is able to keep the turntable in the brake state without continually pressing the button. Furthermore, the button and the push button can be operated by the same finger, which is very convenient.

4. The button and the clamping block are two individual parts that are structurally separated. Since the braking of the turntable depends on the engagement of the clamping block with the clamping teeth, when the turntable is locked, no matter how the pet pulls the hauling rope, the impact force imposed on the turntable by the hauling rope will be transferred only to the clamping block and subsequently to the housing. It will not impact the button, thereby extending the service life of the button.

BRIEF DESCRIPTION OF DRAWINGS

The present disclosure will be further described below with reference to drawings and exemplary embodiments.

Numeral references used in the figures identify the following objects related to the present disclosure: 1a. handle; 1b. rope hole; 1c. spring-positioning groove; 1d. limiting stop pin; 1. housing; 2. turntable; 3. hauling rope; 4. clamping tooth; 4a. tooth tip portion; 4b. arcuate guide slant; 5. button; 5a. button body; 5b. hinged end; 5c. drive end; 5d. push button; 5e. limiting push plate; 5f. elastic clamping strip; 5g. limiting boss; 6. rubber collar; 7. clamping block; 7a. turning sleeve; 7b. button fitting portion; 7c. spring fitting portion; 7d. clamping-tooth fitting portion; 7e. reinforcement plate; 7f. spring-positioning boss; and 8. return spring.

DETAILED DESCRIPTION OF PREFERRED EMBODIMENTS

Figure 1:
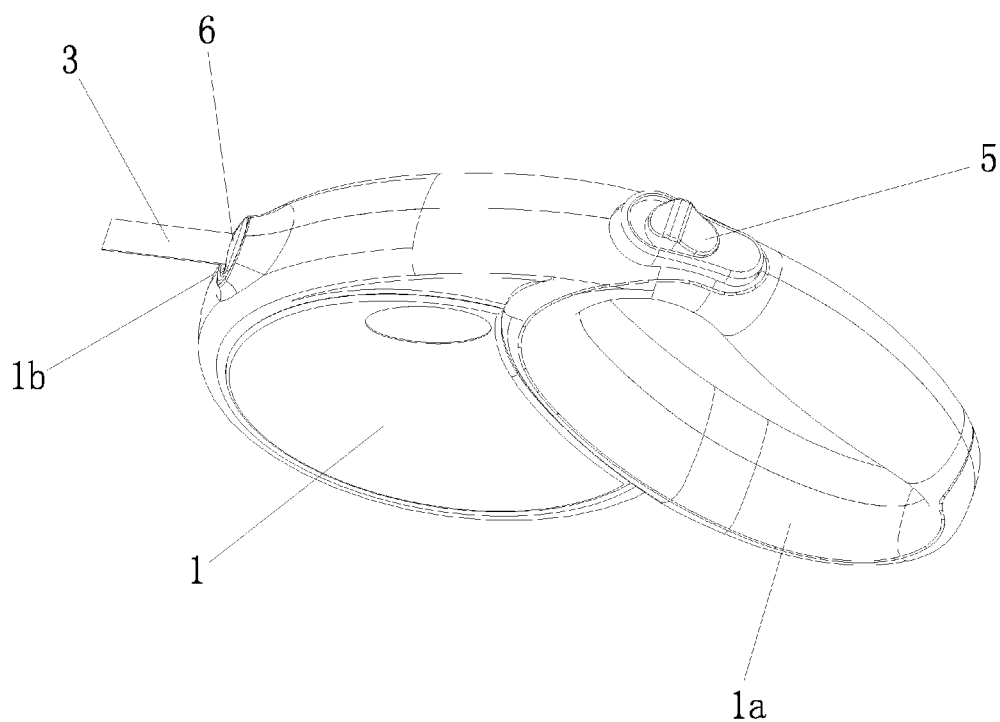
FIG. 1 is an external view of a pet leash in accordance with an embodiment of the present disclosure.
Figure 2:
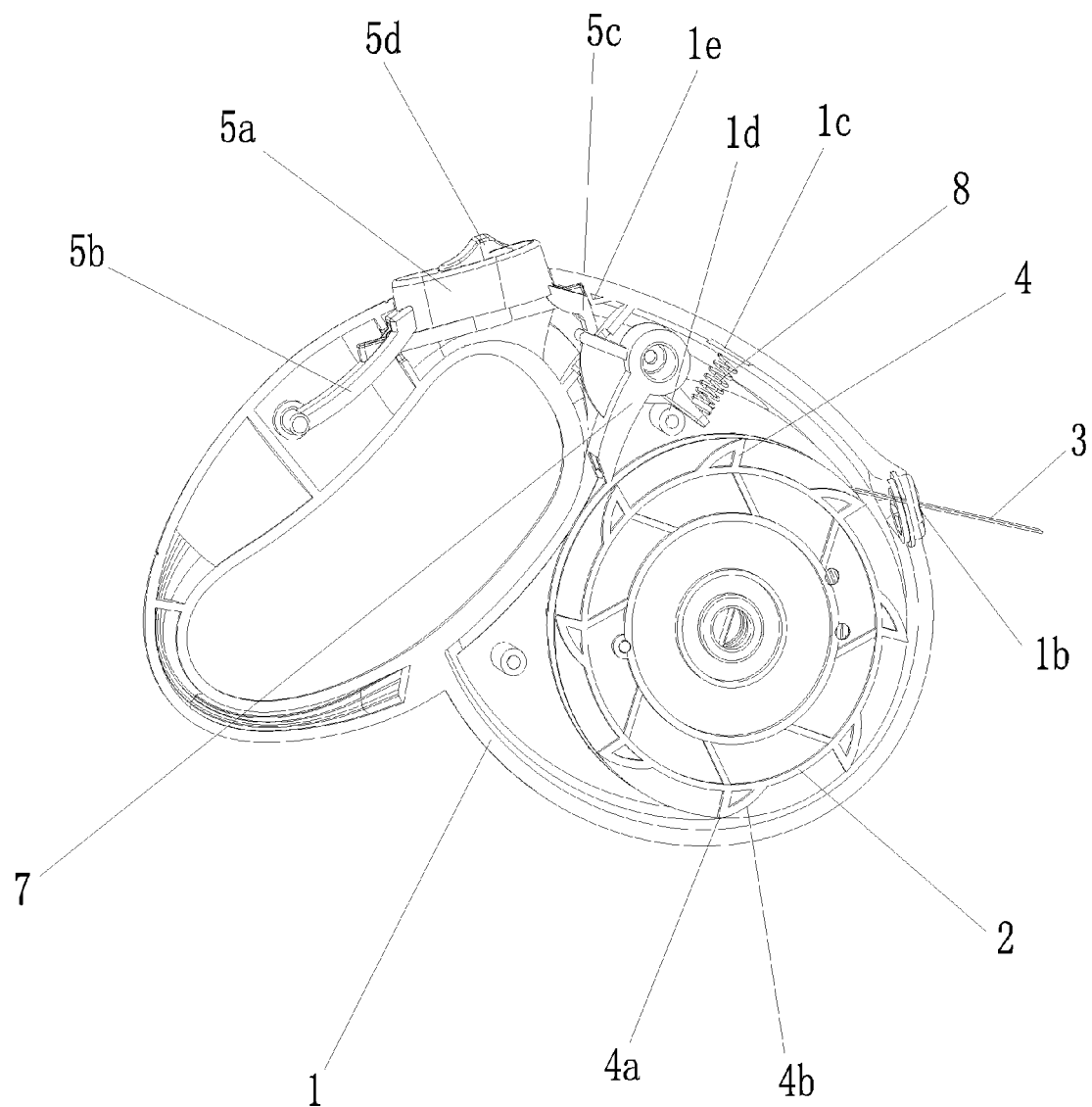
FIG. 2 is an internal view of a pet leash in accordance with an embodiment of the present disclosure.
Figure 3:
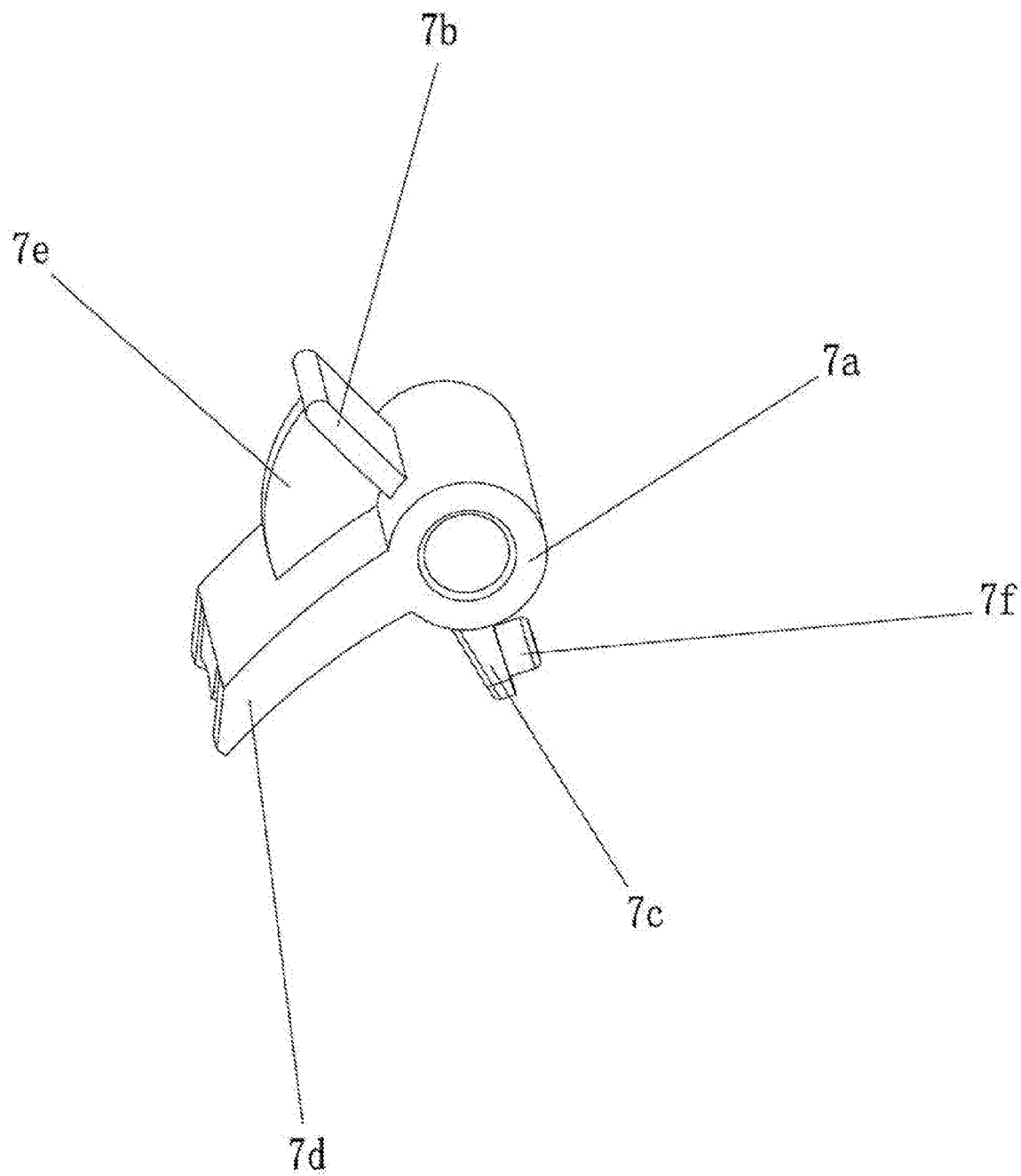
FIG. 3 is a perspective view of a clamping block in a pet leash in accordance with an embodiment of the present disclosure.

FIGS. 1, 2 and 3 illustrate an embodiment of the pet leash according to the present disclosure. The pet leash includes a housing 1, a turntable 2 rotationally disposed in the housing 1, and a hauling rope 3 coiled on the turntable 2. The housing 1 has a handle 1a and a rope hole 1b formed thereon, with the hauling rope 3 leading out of the rope hole 1b. The handle 1a is provided for the convenience of the user to hold the leash.

The key improvement of this example is as follows: The handle 1a is provided with a button 5 exposed out of the housing 1, and inside the housing 1a clamping block 7 is provided that is mechanically coupled with the button 5 to perform linkage operations. A return spring 8 is disposed between the clamping block 7 and the housing 1, and the turntable 2 has a plurality of clamping teeth 4 formed thereon that are configured to engage with the clamping block 7. In a natural state, due to an elastic force of the return spring 8, the clamping block 7 stays in a first work position, where the clamping block 7 is separated from the clamping teeth 4 and the turntable 2 is allowed to rotate freely. After the button 5 is pressed, the clamping block 7 is moved by the linkage operation to a second work position, where the clamping block 7 is engaged with the clamping teeth 4, and the turntable 2 is thus locked circumferentially and not allowed to rotate.

When the pet starts to run away, pressing the button 5 would engage the clamping block 7 with the clamping teeth 4, locking the turntable 2 circumferentially from rotation. Consequently, the hauling rope 3 cannot be pulled out further, limiting the pet's running range.

FIG. 3 illustrates a clamping block according to an embodiment of the present disclosure. The clamping block 7 includes a turning sleeve 7a that is rotationally mounted in the housing 1. The turning sleeve 7a is provided on its outer wall with a button fitting portion 7b, a spring fitting portion 7c and a clamping-tooth fitting portion 7d, each extending radially outward from a center of the turning sleeve. The return spring 8 is clamped between the spring fitting portion 7c and the housing 1. Besides, the button fitting portion 7b, the spring fitting portion 7c and the clamping-tooth fitting portion 7d are disposed with certain angles between them.

The button 5 includes a button body 5a that is exposed out of the housing 1, a hinged end 5b that is disposed on a rear end of the button body 5a and hinged with an inner side of the housing 1, as well as a drive end 5c that is disposed on a front end of the button body 5g and abutting the button fitting portion 7b.

Referring to FIG. 2, in an natural state, due to an elastic force of the return spring 8, the turning sleeve 7a would rotate clockwise in the figure such that the button fitting portion 7b connected thereto presses the button 5 tightly against the housing. At this time, the turning sleeve 7a is in a first angular position, and the clamping-tooth fitting portion 7d is separated from the clamping teeth 4 such that the turntable 2 is allowed to rotate freely. Also referring to FIG. 2, when the button 5 is pressed by the user such that the button body 5a moves in a downward direction of the figure, the hinged end 5b in the rear of the button 5 would rotate clockwise around its hinge point, and the drive end 5c in the front of the button 5 would also move clockwise accordingly and abut the button fitting portion 7b, thereby driving the turning sleeve 7a to rotate counterclockwise to a second angular position, where the return spring is pressed and become shorter. At this time, the clamping-tooth fitting portion 7d is engaged with the clamping teeth 4, and the turntable 2 is circumferentially locked, preventing the hauling rope 3 from being pulled out further. After the button 5 is released, under the action of the elastic force of the return spring 8, the button 5 and the clamping block 7 would return to their respective initial positions, and the clamping-tooth fitting portion 7d is again separated from the clamping teeth 4.

In order to reinforce the structural strength of the clamping block 7, a reinforcement plate 7e is disposed between the button fitting portion 7b and the clamping-tooth fitting portion 7d, connecting the two portions.

In this embodiment, the turning sleeve 7a, the button fitting portion 7b, the spring fitting portion 7c, the clamping-tooth fitting portion 7d and the reinforcement plate 7e are formed as an integral piece.

In order to facilitate positioning of the return spring 8, the spring fitting portion 7c in this embodiment is provided at its end with a spring-positioning boss 7f, and the housing 1 is provided on its inner side with a spring-positioning groove 1c. One end of the return spring 8 is sleeved onto the spring-positioning boss 7f while another end of the return spring 8 abuts an inner side of the spring-positioning groove 1c.

In order to extend the service life of the hauling rope 3 and prevent the hauling rope 3 from being worn quickly by the wall of the rope hole, the embodiment employs a rubber collar 6 that is mounted around the rope hole 3.

The housing 1 is provided on its inner side with a limiting stop pin 1d that is configured to engage with the spring fitting portion 7c so as to limit the rotation angle of the clamping block 7 under the action of the elastic force of the return spring 8.

When the button 5 is pressed, in order to ensure successful engagement between the clamping-tooth fitting portion 7d and the clamping teeth 5 and avoid deviation of the moving direction of the clamping-tooth fitting portion 7d, the clamping-tooth fitting portion 7d of this embodiment is provided at its end with a guiding groove 7d-1 that is configured to engage with the turntable 2. The guiding groove 7d-1 is able to guide the moving direction of the clamping-tooth fitting portion 7d and avoid deviation.

Figure 4:
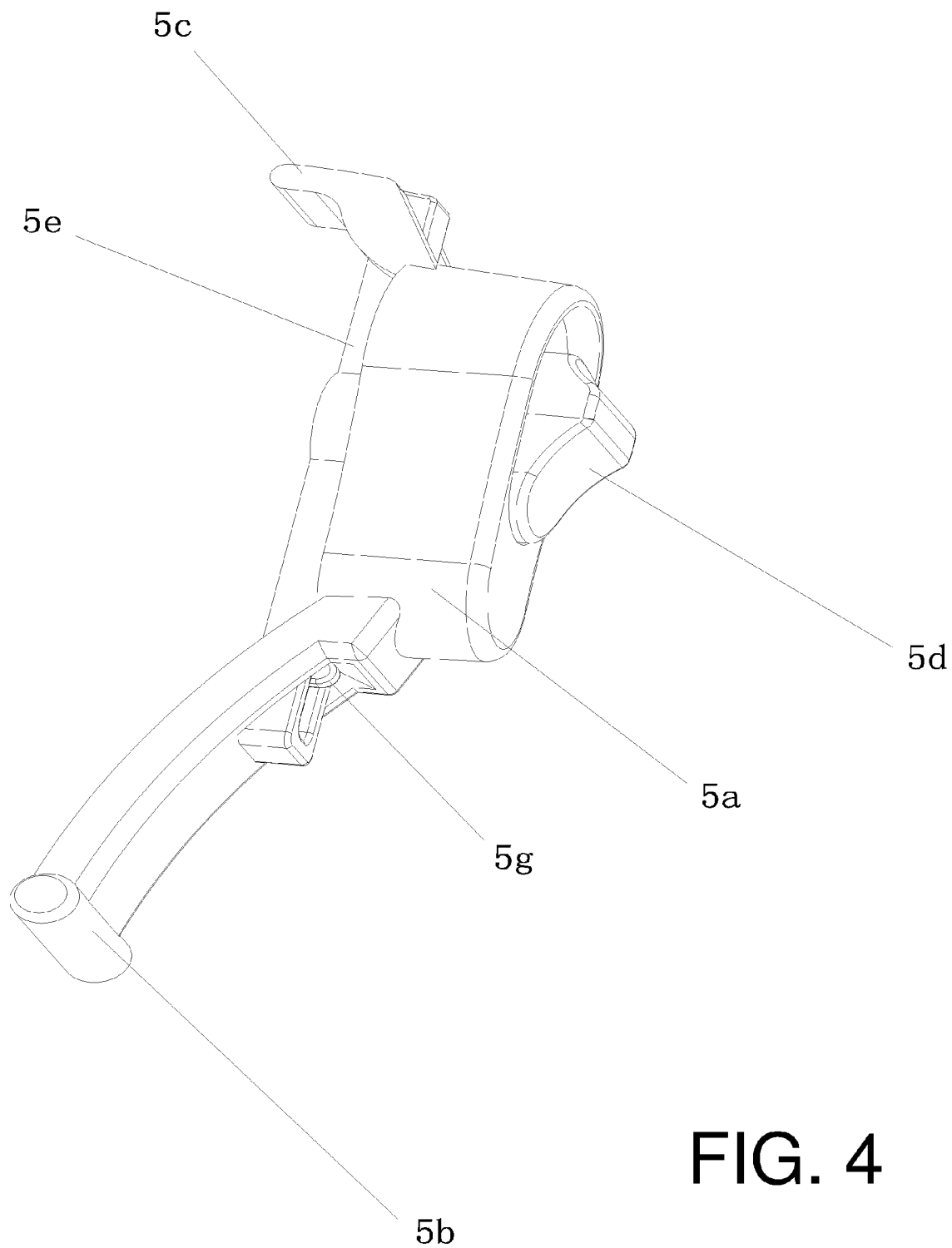
FIG. 4 is a perspective view of a button in a pet leash in accordance with an embodiment of the present disclosure.
Figure 5:
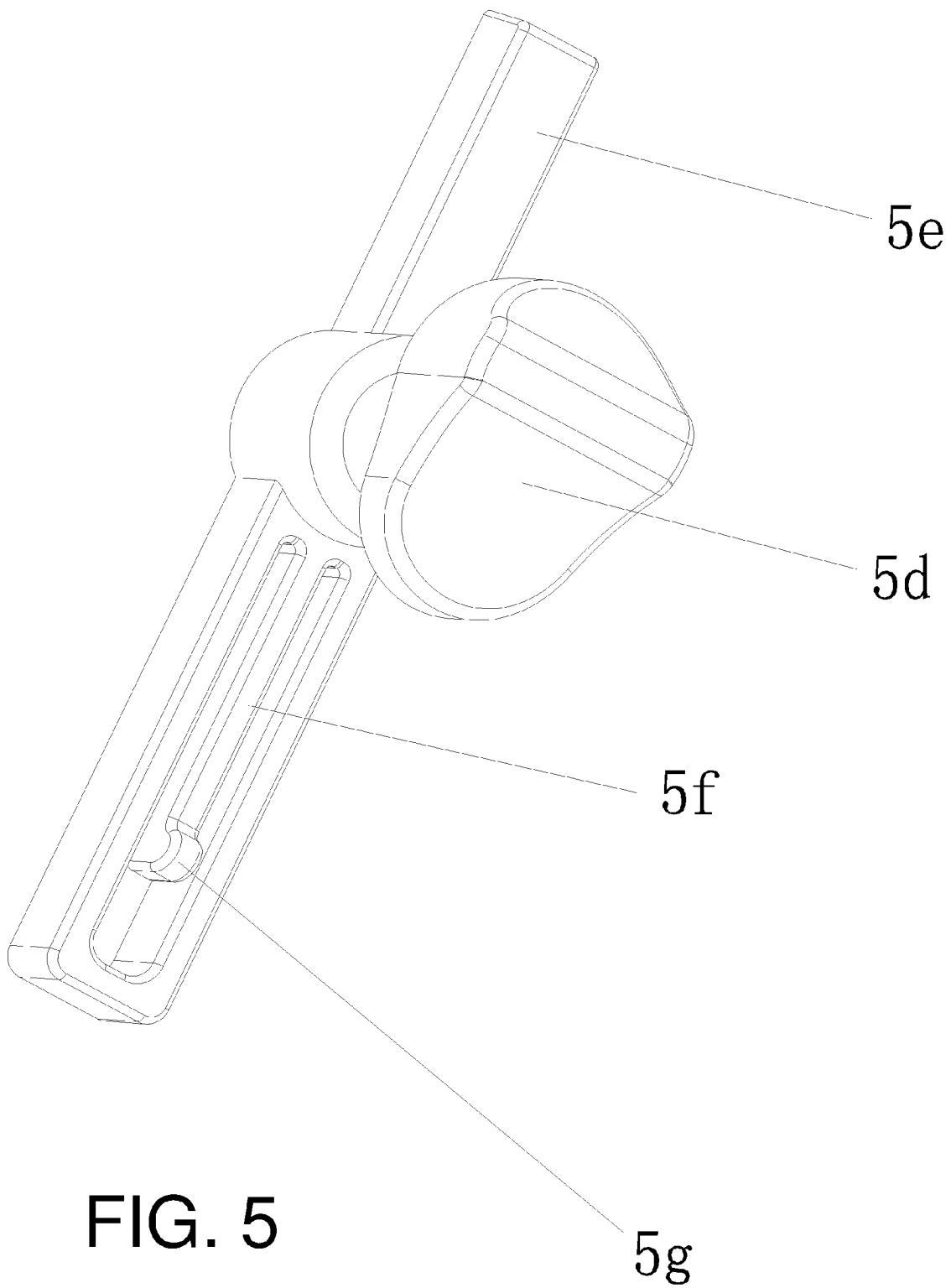
FIG. 5 is a perspective view of a part of a button in a pet leash in accordance with an embodiment of the present disclosure.

Besides, as shown in FIGS. 4 and 5, the button body 5a of the embodiment is provided with a limiting push plate 5e that is configured to move back and forth, as well as a push button 5d that is fixed on the limiting push plate. The limiting push plate 5e is located inside the housing 1 while the push button 5d is located outside the housing 1. The push button is disposed with the button body such that a thumb used for pressing the button can also be used to move this push button directly. The housing 1 is further provided on its inner side with a clamping groove 1e that is configured to engage with the limiting push plate 5e. Such arrangement has the following purpose: After the button 5 is pressed to cause the turntable 2 locked, the push button 5d is pushed manually to engage the limiting push plate 5e with the clamping groove 1e, thereby fixing the limiting push plate 5e and the clamping groove 1e mutually with each other. Even if the pressure on the button 5 is released at this time, the button 5 would still remain in the pressed-down position instead of being restored under the action of the elastic force of the return spring 8. As such, the clamping block 7 remains engaged with the clamping teeth 4 of the turntable 2, and the turntable 2 remains locked and the hauling rope 3 remains unable to be pulled out. To unlock the turntable 2, the user simply needs to push the push button in the opposite direction.

In order to prevent the push button 5d or the limiting push plate 5e from being in an unstable position and moving back and forth freely, the limiting push plate 5e of this embodiment is connected with an elastic clamping strip 5f that is provided at its end with a limiting boss 5g. The limiting boss 5g is configured to engage with the button body 5a. Under the joint action of the elastic clamping strip 5f and the limit boss 5g, a certain static friction is present between the limiting push plate 5e and the button body 5a, clamping the limit push plate 5e at a certain position either forward or backward. Consequently, the push button 5d and the limiting push plate 5e are refrained from moving back and forth freely; rather, they will move only when a certain push force is applied either forward or backward onto the push button 5d. The button body 5a is provided with a limiting groove (not shown in the figures) corresponding to the limiting boss 5g.

In addition, each of the clamping teeth 4 of the embodiment has a tooth tip portion 4a at the top and an arcuate guide slant 4b extending downward from the tooth tip portion toward the center of the turntable. Such arrangement has the following advantage: When the button 5 is pressed, should an end of the clamping-tooth fitting portion 7d goes in contact with the tooth tip portion 4a or the arcuate guide slant 4b of one of the clamping teeth 4 while moving downward, the clamping-tooth fitting portion 7d will not be prevented from moving downward due to a dead-locked with the tooth tip portion 4a or the arcuate guide slant 4b. Instead, the clamping-tooth fitting portion 7d will slide past the tooth tip portion 4a or the arcuate guide slant 4b with the turntable rotating clockwise by a certain angle in FIG. 2 and get engaged with the next clamping tooth 4. Therefore, no matter to what a position the turntable 2 rotates, a stable engagement between the clamping block and the clamping teeth 4 is guaranteed so long as the button 5 is pressed. There will not be a situation where the button 5 gets stuck and not able to be pressed.

Certainly, the above example embodiments are used only for explaining the technical concepts and characteristics of the present disclosure. They are provided to enable people to understand and implement the present disclosure, rather than to limit the scope of protection of the present disclosure. All equivalent alterations or modifications made according to the spiritual essence of the main technical solution of the present disclosure shall fall within the scope of protection of the present disclosure.

What is claimed is:
1. A pet leash, comprising:
a housing having a handle formed thereon;
a turntable rotationally disposed in the housing; and
a hauling rope coiled on the turntable,
wherein:
  the housing is provided with a rope hole configured to lead out the hauling rope;
  the handle is provided with a button exposed out of the housing;
  a clamping block is provided inside the housing, and is mechanically coupled with the button to perform linkage operations;
  a return spring is disposed between the clamping block and the housing;
  the turntable comprises a plurality of clamping teeth configured to engage with the clamping block;

the clamping block comprises:
- a turning sleeve, rotationally mounted in the housing;
- a button fitting portion;
- a spring fitting portion; and
- a clamping-tooth fitting portion, wherein the button fitting portion, the spring fitting portion and the clamping-tooth fitting portion are disposed on an outer wall of the turning sleeve, and extend radially outward from a center of the turning sleeve, and wherein the return spring is clamped between the spring fitting portion and the housing;

the button comprises:
- a button body exposed out of the housing;
- a hinged end on a rear end of the button body and hinged with an inner side of the housing; and
- a drive end on a front end of the button body and abutting the button fitting portion;

in a first state with the button not pressed, due to an elastic force of the return spring, the turning sleeve is in a first angular position such that the clamping-tooth fitting portion is separated from the clamping teeth and the turntable is allowed to rotate freely;

in a second state with the button pressed, the drive end on the front end of the button body abuts and moves the button fitting portion, thereby driving the turning sleeve to rotate to a second angular position and rendering the clamping-tooth fitting portion engaged with the clamping teeth, locking the turntable circumferentially; and the button body is provided with a limiting push plate configured to move back and forth, and further provided with a push button fixed on the limiting push plate, wherein the limiting push plate is located inside the housing and the push button is located outside the housing, and wherein a clamping groove is provided on the inner side of the housing, the clamping groove configured to engage with the limiting push plate.

2. The pet leash of claim 1, wherein the button fitting portion is connected to the clamping-tooth fitting portion through a reinforcement plate disposed therebetween.

3. The pet leash of claim 1, wherein a spring-positioning boss is provided at an end of the spring fitting portion, a spring-positioning groove is provided on the inner side of the housing, and wherein a first end of the return spring is sleeved onto the spring-positioning boss and a second end of the return spring abuts an inner side of the spring-positioning groove.

4. The pet leash of claim 1, wherein the rope hole comprises a rubber collar.

5. The pet leash of claim 1, wherein a limiting stop pin is provided on the inner side of the housing, the limiting stop pin configured to engage with the spring fitting portion.

6. The pet leash of claim 1, wherein a guiding groove is provided at an end of the clamping-tooth fitting portion, the guiding groove configured to engage with the turntable.

7. The pet leash of claim 1, wherein the limiting push plate is connected with an elastic clamping strip, and wherein a limiting boss is provided at an end of the elastic clamping strip, the limiting boss configured to engage with the button body.

8. The pet leash of claim 1, wherein each of the clamping teeth comprises a tooth tip portion and an arcuate guide slant extending from the tooth tip portion toward a center of the turntable.

* * * * *